(12) United States Patent
Flynn et al.

(10) Patent No.: US 10,206,057 B2
(45) Date of Patent: *Feb. 12, 2019

(54) USER-SELECTABLE ENVIRONMENTS FOR MOBILE COMMUNICATIONS DEVICES

(71) Applicant: Microsoft Technology Licensing, LLC, Redmond, WA (US)

(72) Inventors: Donna K. Flynn, Nederland, CO (US); Tracey N. Lovejoy, Seattle, WA (US); Michael C. Medlock, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,653

(22) Filed: Nov. 28, 2017

(65) Prior Publication Data
US 2018/0184237 A1     Jun. 28, 2018

Related U.S. Application Data

(63) Continuation of application No. 14/472,292, filed on Aug. 28, 2014, now Pat. No. 98,606,861, which is a
(Continued)

(51) Int. Cl.
  *H04W 4/02*    (2018.01)
  *H04M 3/42*    (2006.01)
  (Continued)

(52) U.S. Cl.
  CPC ............. *H04W 4/02* (2013.01); *H04M 1/663* (2013.01); *H04M 3/42042* (2013.01);
  (Continued)

(58) Field of Classification Search
  CPC ..................................................... H04W 4/12
  See application file for complete search history.

(56) References Cited

U.S. PATENT DOCUMENTS 6,765,726 B2   7/2004   French et al.
6,788,809 B1   9/2004   Grzeszczuk et al.
(Continued)

FOREIGN PATENT DOCUMENTS

CN    101321334 A    12/2008
CN    101669350 A    3/2010
(Continued)

OTHER PUBLICATIONS

"Photo Contacts PRO TM: Windows Mobile Smartphone Edition", Retrieved From <<http://www.pocketx.net/products/photoc.ontactspro_sm>>, Aug. 3, 2009, 13 Pages.
(Continued)

*Primary Examiner* — Charles N Appiah
*Assistant Examiner* — Frank E Donado
(74) *Attorney, Agent, or Firm* — Alleman Hall Creasman & Tuttle LLP

(57) ABSTRACT

At a mobile communications device, a communication is received from a communication source. An indication of an environment type associated with the communication source is obtained, and a check is made as to whether the indication of the environment type associated with the communication source matches a current environment type of the mobile communications device. An initial notification (and optionally a leave-behind notification) of the communication is presented only if the indication of the environment type associated with the communication source matches the current environment type of the mobile communications device.

20 Claims, 5 Drawing Sheets

Related U.S. Application Data continuation of application No. 12/564,450, filed on Sep. 22, 2009, now Pat. No. 8,843,116.

(51) Int. Cl.
| | | |
|---|---|---|
| *H04W 4/16* | (2009.01) | |
| *H04W 8/18* | (2009.01) | |
| *H04W 8/22* | (2009.01) | |
| *H04M 1/663* | (2006.01) | |
| *H04M 1/725* | (2006.01) | |

(52) U.S. Cl.
CPC ........ *H04W 8/183* (2013.01); *H04M 1/72569* (2013.01); *H04M 2203/2066* (2013.01); *H04W 4/16* (2013.01); *H04W 8/22* (2013.01)

(56) References Cited

U.S. PATENT DOCUMENTS

| | | | |
|---|---|---|---|
| 6,801,637 | B2 | 10/2004 | Voronka et al. |
| 6,873,723 | B1 | 3/2005 | Aucsmith et al. |
| 6,876,496 | B2 | 4/2005 | French et al. |
| 6,937,742 | B2 | 8/2005 | Roberts et al. |
| 6,950,534 | B2 | 9/2005 | Cohen et al. |
| 7,003,134 | B1 | 2/2006 | Covell et al. |
| 7,036,094 | B1 | 4/2006 | Cohen et al. |
| 7,038,855 | B2 | 5/2006 | French et al. |
| 7,039,676 | B1 | 5/2006 | Day et al. |
| 7,042,440 | B2 | 5/2006 | Pryor et al. |
| 7,050,606 | B2 | 5/2006 | Paul et al. |
| 7,069,018 | B1 | 6/2006 | Granstam et al. |
| 7,289,616 | B2 | 10/2007 | Punaganti Venkata et al. |
| 7,373,142 | B2 | 5/2008 | Scott |
| 7,492,884 | B2 | 2/2009 | Schwab et al. |
| 7,653,380 | B2 | 1/2010 | Graefen |
| 7,783,283 | B2 * | 8/2010 | Kuusinen ............... H04M 1/575 455/412.2 |
| 8,135,391 | B2 | 3/2012 | Scott et al. |
| 8,781,491 | B2 | 7/2014 | Wright et al. |
| 8,843,116 | B2 | 9/2014 | Flynn et al. |
| 2002/0077086 | A1 | 6/2002 | Tuomela et al. |
| 2002/0137503 | A1 | 9/2002 | Roderique |
| 2002/0198004 | A1 | 12/2002 | Heie et al. |
| 2003/0054866 | A1 | 3/2003 | Byers et al. |
| 2003/0100295 | A1 | 5/2003 | Sakai et al. |
| 2004/0154022 | A1 | 8/2004 | Boss et al. |
| 2005/0041793 | A1 | 2/2005 | Fulton et al. |
| 2006/0018441 | A1 | 1/2006 | Timmins et al. |
| 2006/0041923 | A1 | 2/2006 | McQuaide, Jr. |
| 2006/0063563 | A1 | 3/2006 | Kaufman |
| 2006/0072726 | A1 | 4/2006 | Klein et al. |
| 2006/0182248 | A1 * | 8/2006 | Smith ................. H04M 1/2745 379/201.01 |
| 2006/0234711 | A1 | 10/2006 | McArdle |
| 2007/0032261 | A1 * | 2/2007 | Boyer ............... H04M 1/72566 455/550.1 |
| 2007/0263803 | A1 | 11/2007 | Chan |
| 2008/0032679 | A1 | 2/2008 | Purontaus et al. |
| 2008/0057926 | A1 | 3/2008 | Forstall et al. |
| 2008/0132290 | A1 | 6/2008 | Sharabi et al. |
| 2008/0159522 | A1 * | 7/2008 | Ericson ............. H04M 1/72566 379/373.02 |
| 2008/0207174 | A1 * | 8/2008 | Murri ...................... H04W 4/16 455/412.1 |
| 2008/0207184 | A1 | 8/2008 | Wassingbo et al. |
| 2008/0233932 | A1 | 9/2008 | Sapp |
| 2008/0233937 | A1 | 9/2008 | Nurmela et al. |
| 2008/0248761 | A1 | 10/2008 | Seo et al. |
| 2008/0304470 | A1 | 12/2008 | Ganganna |
| 2008/0305780 | A1 * | 12/2008 | Williams ................. H04W 4/02 455/414.1 |
| 2009/0041222 | A1 | 2/2009 | Guven |
| 2009/0190734 | A1 * | 7/2009 | White ............... H04M 3/42102 379/201.02 |
| 2009/0305744 | A1 | 12/2009 | Ullrich |
| 2010/0020728 | A1 | 1/2010 | Jefferson et al. |
| 2010/0151839 | A1 * | 6/2010 | Krishnamurthy ....... H04M 3/42 455/414.1 |
| 2010/0323657 | A1 | 12/2010 | Barnard et al. |
| 2010/0330974 | A1 | 12/2010 | Balannik et al. |
| 2011/0070870 | A1 | 3/2011 | Flynn et al. |
| 2011/0194680 | A1 | 8/2011 | Mourya et al. |

FOREIGN PATENT DOCUMENTS

| | | |
|---|---|---|
| EP | 1193955 A2 | 4/2002 |
| JP | 2005051415 A | 2/2005 |
| JP | 2007135006 A | 5/2007 |
| JP | 2007266982 A | 10/2007 |
| KR | 1020040087168 A | 10/2004 |
| KR | 1020060026144 A | 3/2006 |
| KR | 1020070052373 A | 5/2007 |
| KR | 1020070055692 A | 5/2007 |
| KR | 1020090017010 A | 2/2009 |
| RU | 63630 U1 | 5/2007 |
| WO | 2005046191 A1 | 5/2005 |
| WO | 2006048511 A1 | 5/2006 |

OTHER PUBLICATIONS

"Notice of Allowance Issued in Korean Patent Application No. 10-2012-7007338", dated Jan. 20, 2016, 6 Pages.

"Office Action Issued in European Patent Application No. 10819214.7", dated Dec. 7, 2016, 8 Pages.

"Supplementary Search Report Issued in European Patent Application No. 10819214.7", dated Nov. 23, 2016, 4 Pages.

"Final Office Action Issued in U.S. Appl. No. 12/564,450", dated Sep. 25, 2012, 20 Pages.

"Non-Final Office Action Issued in U.S. Appl. No. 12/564,450", dated Sep. 29, 2011, 22 Pages.

"Non-Final Office Action Issued in U.S. Appl. No. 12/564,450", dated Mar. 12, 2012, 19 Pages.

"Non-Final Office Action Issued in U.S. Appl. No. 12/564,450", dated Jun. 5, 2013, 20 Pages.

"Non-Final Office Action Issued in U.S. Appl. No. 12/564,450", dated Nov. 29, 2013, 17 Pages.

"Notice of Allowance Issued in U.S. Appl. No. 12/564,450", dated May 9, 2014, 15 Pages.

"Notice of Allowance Issued in U.S. Appl. No. 12/564,450", dated Jul. 30, 2014, 2 pages.

"Non-final Office Action Issued in U.S. Appl. No. 12/564,450", dated Feb. 8, 2013, 20 Pages.

"Final Office Action Issued in U.S. Appl. No. 14/472,292", dated Oct. 27, 2015, 21 Pages.

"Final Office Action Issued in U.S. Appl. No. 14/472,292", dated Oct. 26, 2016, 21 Pages.

"Non-final Office Action Issued in U.S. Appl. No. 14/472,292", date Feb. 10, 2017, 24 Pages.

"Non-final Office Action Issued in U.S. Appl. No. 14/472,292", dated Mar. 31, 2016, 21 Pages.

"Non-final Office Action Issued in U.S. Appl. No. 14/472,292", dated May 19, 2015, 20 Pages.

"Notice of Allowance Issued in U.S. Appl. No. 14/472,292", dated Aug. 29, 2017, 15 Pages.

"Office Action Issued in Canadian Patent Application No. 2,771,174", dated Jun. 29, 2016, 4 Pages.

"Notice of Allowance Issued in Australian Patent Application No. 2010298650", dated Jun. 11, 2014, 2 Pages.

"Fifth Office Action Issued in Chinese Patent Application No. 201080042088.3", dated May 9, 2016, 11 Pages.

"Fourth Office Action Issued in Chinese Application No. 201080042088.3", dated Nov. 13, 2015, 10 Pages.

"Office Action Issued in Chinese Patent Application No. 201080042088.3", dated Aug. 10, 2016, 7 Pages.

"Office Action Issued in China Patent Application No. 201080042088.3", dated Mar. 18, 2014, 13 Pages.

"Response to Office Action filed in Chinese Patent Application No. 201080042088.3", dated Nov. 23 2016, 9 Pages.

(56) References Cited

OTHER PUBLICATIONS

"Response to Office Action filed in Chinese Patent Application No. 201080042088.3", Filed Date: Jul. 22, 2016, 18 Pages.
"Response to Office Action filed in Chinese Patent Application No. 201080042088.3", Filed Date: Jan. 23, 2016, 18 Pages.
"Second Office Action Issued in Chinese Patent Application No. 201080022432.2", dated Nov. 15, 2014, 9 Pages.
"Third Office Action and Search Report Issued in Chinese Patent Application No. 201080042088.3", dated May 26, 2015, 13 Pages.
"Notice of Allowance Issued in Russian Patent Application No. 2012110823", dated Jan. 20, 2015, 21 Pages.
"Office Action Issued in Russian Patent Application No. 2012110823", dated Aug. 20, 2014, 8 Pages.
"Notice of Allowance Issued in Japanese Patent Application No. 2012-529782", dated Sep. 15, 2015, 3 Pages.
"Office Action Issued in Japanese Patent Application No. 2012-529782", dated May 20, 2014, 7 Pages.
"Office Action Issued in Japanese Patent Application No. 2012-529782", dated Dec. 25, 2014, 10 Pages.
"Office Action Issued in Canadian Patent Application No. 2771174", dated Dec. 19, 2016, 4 Pages.
"International Search Report and Written Opinion Issued in PCT Application No. PCT/US2010/47058", dated May 27, 2011, 9 Pages.
Rosalie, Marshal, "Nokia E63 Switches Between Work and Personal", Retrieved From <<http://www.v3.co.uk/vnunetlnews/2230332/nokia-e63-release>>, Nov. 12, 2008, 2 Pages.
Wobcke, et al., "A Call Handling Assistant for Mobile Devices", In Proceedings of the IEEE/WIC/ACM International Conference on Intelligent Agent Technology, Dec. 18, 2006, 4 Pages.
"Office Action Issued in Australia Patent Application No. 2010298650", dated Mar. 26, 2014, 3 Pages.
"Office Action Issued in European Patent Application No. 10819214.7", dated Dec. 22, 2017, 8 Pages.
"Office Action Issued in Canadian Patent Application No. 2,771,174", dated May 25, 2018, 4 Pages.

* cited by examiner

USER-SELECTABLE ENVIRONMENTS FOR MOBILE COMMUNICATIONS DEVICES

RELATED APPLICATION

This application is a continuation of and claims priority under 35 U.S.C. § 120 to U.S. patent application Ser. No. 14/472,292, filed on Aug. 28, 2014, which is a continuation of U.S. patent application Ser. No. 12/564,450, filed on Sep. 22, 2009, now U.S. Pat. No. 8,843,116, the entire disclosures of each of which are incorporated by reference herein in their entirety.

BACKGROUND

Mobile communications devices, such as wireless phones, have become increasingly commonplace. As these devices have become more commonplace, people are increasingly using the same device in a variety of different settings, such as both at work and at home. While current mobile communications devices provide numerous advantages, using the same device in these different settings is not without its problems. One such problem is that users can receive work communications when at home, and personal communications when at work. This can lead to frustration and annoyance for the user as they can be interrupted by work communications when at home and interrupted by personal communications when at work.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, at a mobile communications device a communication is received from a source device. An indication of an environment type associated with the communication source is obtained, and a check is made as to whether the indication of the environment type associated with the communication source matches a current environment type of the mobile communications device. An initial notification (and optionally a leave-behind notification) of the communication is presented only if the indication of the environment type associated with the communication source matches the current environment type of the mobile communications device.

In accordance with one or more aspects, a mobile communications device includes a current environment indicator, a contact list, and a decision module. The current environment indicator identifies a current environment type in which the mobile communications device is being used. The contact list identifies multiple communication sources from which communications can be received, and for each communication source identifies an environment type associated with the communication source. The decision module is coupled to obtain the current environment type in which the mobile communications device is being used and the environment type associated with the communication source from which a communication is received. The decision module is further to compare the current environment type in which the mobile communications device is being used to the environment type associated with the communication source from which the communication is received, and indicate that a user interface module is to present an initial notification (and optionally a leave-behind notification) of the communication only if the current environment type in which the mobile communications device is being used matches the environment type associated with the communication source from which the communication is received.

BRIEF DESCRIPTION OF THE DRAWINGS

The same numbers are used throughout the drawings to reference like features.

DETAILED DESCRIPTION

User-selectable environments for mobile communications devices is discussed herein. A mobile communications device allows the user to select between different environments, such as personal and work environments. This selection can be a direct user selection, such as setting of a "personal/work" button or switch. This button or switch can be a physical piece of hardware or virtual in nature (e.g. a software "button"). When a communication is received by the device, a source of the communication is compared to a contacts list of the device. The contacts list includes an environment type associated with the source (e.g., indicating an environment type of work, personal, or both). If the current environment type of the device (e.g., personal or work) matches the environment type associated with the source, then the device plays back an audible notification of the communication; otherwise, the device does not play back an audible notification of the communication.

Additionally, selecting between different environments can result in various other changes to the mobile communications device. These changes can include changes to the information displayed by the mobile communications device and/or the manner in which changes are made.

Figure 1:
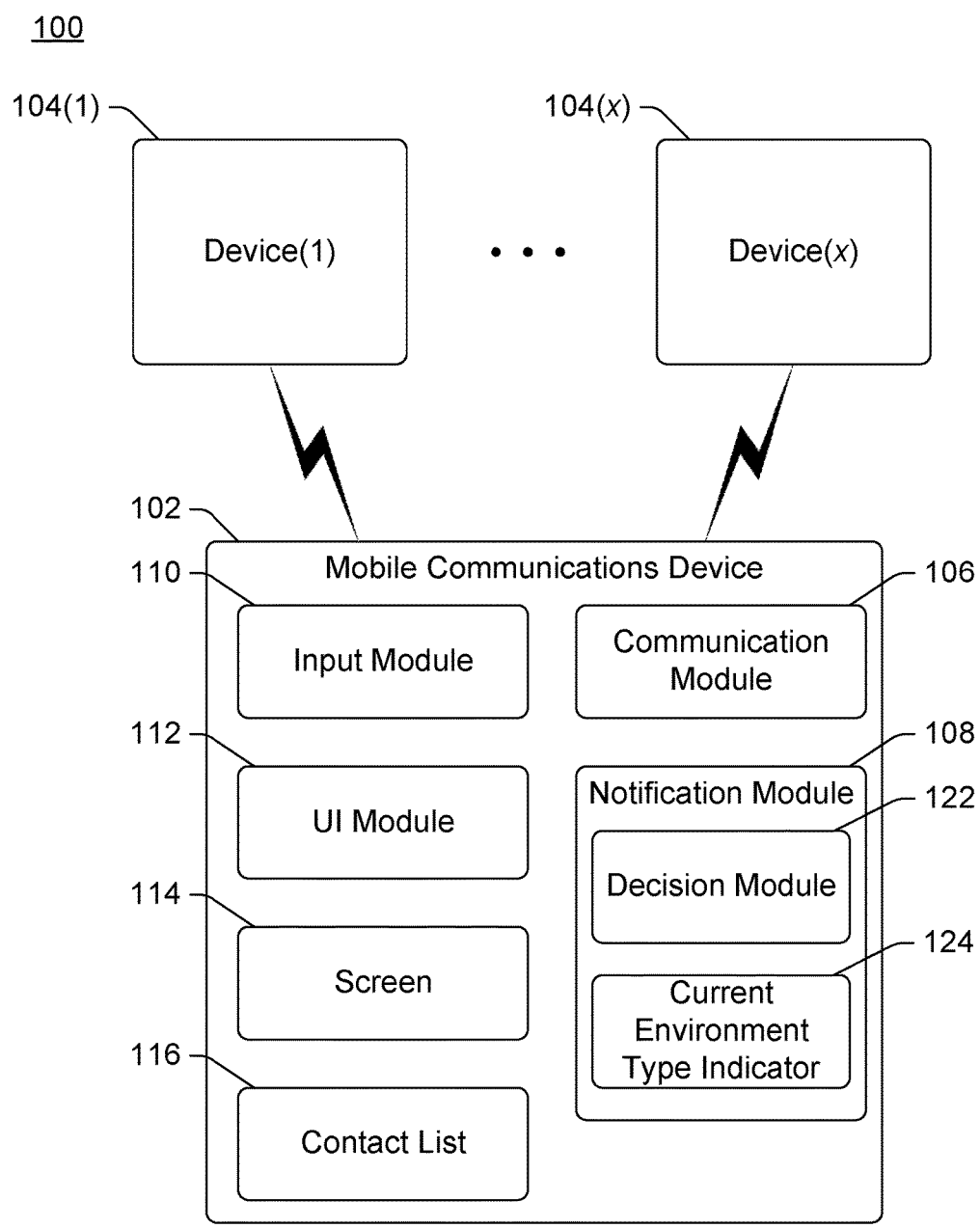
FIG. 1 illustrates an example system implementing the user-selectable environments for mobile communications devices in accordance with one or more embodiments.

FIG. 1 illustrates an example system 100 implementing the user-selectable environments for mobile communications devices in accordance with one or more embodiments. System 100 includes a mobile communications device 102 that can communicate with one or more (x) other devices 104(1), . . . , 104(x). A mobile communications device refers to a communications device capable of sending and receiving communications, such as phone calls, text messages, messages including other content types, and so forth. Communications device 102 is referred to as being mobile because it is typically designed to be moved and used in different locations by users. Mobile communications device 102 can be a variety of different types of devices, such as a cellular phone, a satellite phone, other types of wireless phones, a handheld computer, a laptop computer, a personal digital assistant (PDA), an audio and/or video playback device, a portable game device, an automotive computer, a dedicated messaging device, a netbook, and so forth. It is to be appreciated that mobile communications device 102 can include functionality in addition to being able to send and receive communications calls, such as calendar functionality, audio and/or video playback functionality, and so forth.

Devices 104 can be a variety of different types of devices from which mobile communications device 102 can receive communications. Devices 104 can be, but need not be, mobile communications devices. Devices 104 can be the same type or alternatively different types of devices as mobile communications device 102.

Mobile communications device 102 includes a communication module 106, a notification module 108, an input module 110, a user interface (UI) module 112, a screen 114, and a contact list 116. Each of modules 106, 108, 110, and 112 can be implemented in software, firmware, hardware, or combinations thereof. When implemented in software or firmware, a module includes one or more instructions that are executed by one or more processors or controllers of mobile communications device 102.

Screen 114 is a display component of mobile communications device 102. Screen 114 can be implemented in a variety of different manners, such as using liquid crystal display (LCD) technology, plasma screen technology, image projection technology, and so forth. Alternatively, rather than including screen 114, mobile communications device 102 can generate one or more signals that are output to other display devices which include screen 114.

Communication module 106 manages receiving of communications from and sending of communications to devices 104. Mobile communications device 102 can communicate with devices 104 using a variety of different technologies and protocols, such as cellular, satellite, wireless LAN, and/or other technologies or protocols. The technologies or protocols can include wireless and/or wired technologies and protocols.

Communication module 106 supports a variety of different types of communications with devices 104. One type of communication typically supported by communication module 106 is a voice call. This can include voice calls that are initiated by mobile communications device 102 (e.g., outgoing calls), as well as voice calls that are initiated by another device 104 (e.g., incoming calls). Alternatively, mobile communications device 102 can support other types of communications, and need not support voice calls.

Another type of communication supported by communication module 106 is a message, which refers to text messages or messages with other types of media such as images, video, audio, combinations of types of media, and so forth. In one or more embodiments, messages comply with the Short Message Service (SMS) communication protocol. In one or more other embodiments, messages comply with the Multimedia Messaging Service (MMS) communication protocol. It is to be appreciated that SMS and MMS are only example protocols, and that other communication protocols can alternatively be used. Various other types of communications can also be supported by communication module 106, such as mobile instant messaging (mobile IM), email (electronic mail), and so forth.

In one or more embodiments, communication module 106 can also communicate with one or more social networking services using a variety of different networks, including the Internet, a local area network (LAN), a public telephone network, an intranet, a cellular or other wireless phone network, other public and/or proprietary networks, combinations thereof, and so forth. Communication module 106 obtains data regarding various individuals or other entities using social networking services.

Input module 110 receives user inputs from a user of mobile communications device 102. User inputs can be provided in a variety of different manners, such as by pressing one or more keys of a keypad or keyboard of device 102, or pressing a particular portion of a touchpad or touchscreen of device 102. Touchscreen functionality can be provided using a variety of different technologies, such as through capacitive, surface acoustic wave, resistive, optical, strain gauge, dispersive signals, acoustic pulse, or other touchscreen technologies. The user input can also be provided in other manners, such as via audible inputs, other physical feedback input to the device (e.g., tapping any portion of device 102 or another action that can be recognized by a motion detection component of device 102, such as shaking device 102, rotating device 102, etc.), and so forth.

UI module 112 generates, manages, and/or outputs a user interface for presentation by device 102. This presentation can include a display on screen 114, playing back audio content (e.g., a ringtone), physically moving device 102 (e.g., vibrating), and so forth. The user interface presents various information, and user inputs can be received by input module 110 as discussed above.

Notification module 108 includes decision module 122 and a current environment indicator 124. Decision module 122 determines, based on current environment indicator 124 and an environment type of a device 104 from which a communication is received, whether to present a notification of the communication to a user of device 102. This determination is discussed in more detail below.

Current environment indicator 124 identifies a current environment type in which mobile communications device 102 is being used. In one or more embodiments, the current environment type is either a work environment or a personal (e.g., home) environment. Alternatively, other environment types can be supported, such as different persona that the user of device 102 desires to present to others, different types of personal environments (e.g., relaxing and no interruptions desired, general leisure time and interruptions are okay), and so forth.

The current environment type is set by a user of device 102, and can be set in different manners via input module 110. In one or more embodiments, mobile communications device 102 includes a user-selectable switch allowing the user to set the current environment type. This user-selectable switch can be a physical switch on device 102. This user-selectable switch can alternatively be a software switch selected by user selection of a button or key (or portion thereof) displayed on screen 114, input of a particular gesture, or other user input as discussed above. For example, the user-selectable switch can be a work/personal switch, allowing the user to easily select a current environment type of work or personal.

In other embodiments, the user can set the current environment type in other manners rather than via a user-selectable switch. For example, the user can select particular times of the day and/or days of the week that correspond to different environments (e.g., from 5 pm to 8 am the device 102 is being used in a personal environment, and from 8 am to 5 pm the device 102 is being used in a work environment). Notification module 108 or alternatively another module of device 102 can monitor the current time for device 102 and update current environment indicator 124 based on these user selections and the current time for device 102.

By way of another example, the user can select particular locations that correspond to different environments (e.g., when device 102 is in one location device 102 is being used in a work environment and when in another location device 102 is begin used in a personal environment). The current location of device 102 can be determined in a variety of different manners, such as by obtaining GPS (Global Positioning System) coordinates for device 102, obtaining a location of device 102 from a cellular or satellite phone system, and so forth. The user can select particular locations that correspond to different environments in different manners, such as selecting locations on a map that are converted to GPS coordinates or other location identifiers, selecting a current location of device 102 and having locations within a particular radius of the current location be selected, and so forth.

It should be noted that information identifying the current location of device 102 need not be maintained long-term by device 102. Once the current location of device 102 is determined device 102 can delete the information, or alternatively device 102 can delete the information after device 102 is moved to a different location and that different location is determined. Furthermore, device 102 uses the information locally and can maintain the information identifying the current location securely—the information need not be revealed to any other device or service. In one or more embodiments, the user of device 102 is able to select to opt-in to using location information to identify different environments, or alternatively opt-out from using location information to identify different environments. Accordingly, if the user desires to not have the current location of device 102 determined in order to identify different environments, the user can easily instruct device 102 to not determine or use such current location information.

Contact list 116 identifies multiple communication sources, each of which is a source from which a communication can be received. For each communication source, contact information is maintained that includes an identifier of the communication source and an indication of an environment type associated with the communication source. Additional contact information can also be included, such as a name of the communication source, other manners (e.g., addresses or phone numbers) that can be used to communicate with the communication source, and so forth.

The identifier of the communication source (e.g., a device 104) can take a variety of different forms. In one or more embodiments, the identifier of a device 104 that is a communication source is an address of the device 104. The address of the device can be, for example, a phone number of the device, an email address of the device, a mobile IM address of the device, and so forth. Such addresses can be programmed into device 104, such as in response to configuration inputs by a user of the device 104, by a reseller when a device 104 is purchased, and so forth. Additionally, such addresses can optionally be stored on a removable card or other storage component that can be transferred to different devices.

Alternatively, the identifier of the communication source (e.g., a device 104) can be an identifier of a user of the device 104. Users are associated with different user identifiers that allow different users to be distinguished from one another. These user identifiers can be GUIDs (Globally Unique Identifiers), or alternatively can be other identifiers. Each user can have multiple different phone numbers, email addresses, mobile IM addresses, and/or other addresses that he or she uses. These different phone numbers, email addresses, mobile IM addresses, and/or other addresses of a user are associated with the user identifier of that user. Accordingly, when a communication is received from one of these phone numbers, email addresses, mobile IM addresses, and/or other addresses, the user identifier associated with the communication can be readily determined and used as an identifier of the communication source.

The different phone numbers, email addresses, mobile IM addresses, and/or other addresses associated with a particular user identifier can be determined in a variety of different manners. In one or more embodiments, the communication source provides the user identifier to mobile communications device 102 as part of the communication. In other embodiments, a database of users is accessed by communication module 106 (or alternatively another module of mobile communications device 102). This database can be a database maintained locally by device 102 (e.g., a local address book or contacts list), or alternatively can be maintained on a remote device or service. The database includes a different record for each user. Each record has a record identifier and also includes the different phone numbers, email addresses, mobile IM addresses, and/or other addresses that that user uses. Accordingly, given a particular phone number or address, the record including that phone number or address can be readily identified, and the record identifier for that record can also be readily identified. The record identifier can then be used as the user identifier for that user.

In addition to an identifier of a communication source, the contact information in contact list 116 includes an environment type associated with the communication source. A communication source can be associated with one or more of a variety of different environment types, analogous to the current environment type discussed above. In one or more embodiments, the environment type associated with a particular communication source is one of the following three types: work, personal, or both.

In one or more embodiments, each communication source has a default associated environment type (e.g., a type of both). The associated environment type can be changed by a specific request by a user. For example, a user can input a request via input module 110 for a particular contact (e.g., as identified by a particular address, user identifier, etc.) in contact list 116 to have a particular associated environment type. This allows the user to specify, for example, for each of one or more contacts in contact list 116 whether the contact (and thus the corresponding communication source) is to have an associated environment type of work or personal.

Alternatively, the association of environment types to communication sources can be performed in different manners. For example, communication module 106 can obtain data from a remote service, such as a social networking service. Communication module 106 can obtain data from a social networking service directly or via an intermediary data service. This remote service can maintain one or more records of which communication sources or contacts are to be associated with which environment types, and these records can be obtained by communication module 106. After these records are obtained, the contacts in contact list 116 are updated accordingly. For example, a user of mobile communications device 102 may maintain a list of friends on a social networking service. Communication module 106 (or alternatively another module in device 102) can access the social networking service, obtain the list of friends, and for each friend in the list of friends that is also a contact in contact list 116 can update the contact to be associated with an environment type of personal.

Additionally, it should be noted that some discussions herein refer to contact list 116 as being stored on device 102 and thus a local contact list on mobile communications device 102, alternatively contact list 116 can be maintained on one or more remote services. For example, contact list 116 can be maintained on a social networking service rather than on device 102.

When a communication is received from a communication source (e.g., a device 104), the identifier of that communication source is determined by communication module 106. Module 106 can determine the identifier in different manners. In one or more embodiments, the identifier is included as part of the communication (e.g., a phone number or other address of device 104 is included as part of the communication) or in metadata associated with the communication. In other embodiments, communication module 106 determines the identifier based on information included in the communication (e.g., determines a user identifier for the user as discussed above).

The identifier of the communication source is provided to decision module 122. Decision module 122 obtains, from contact list 116, the environment type associated with the identified communication source. Decision module 122 also obtains the current environment type indicator 124. Based on this information, decision module 122 determines what notification device 102 is to present for the received communication, and outputs a notification decision identifying what notification (if any) device 102 is to present.

Figure 2:
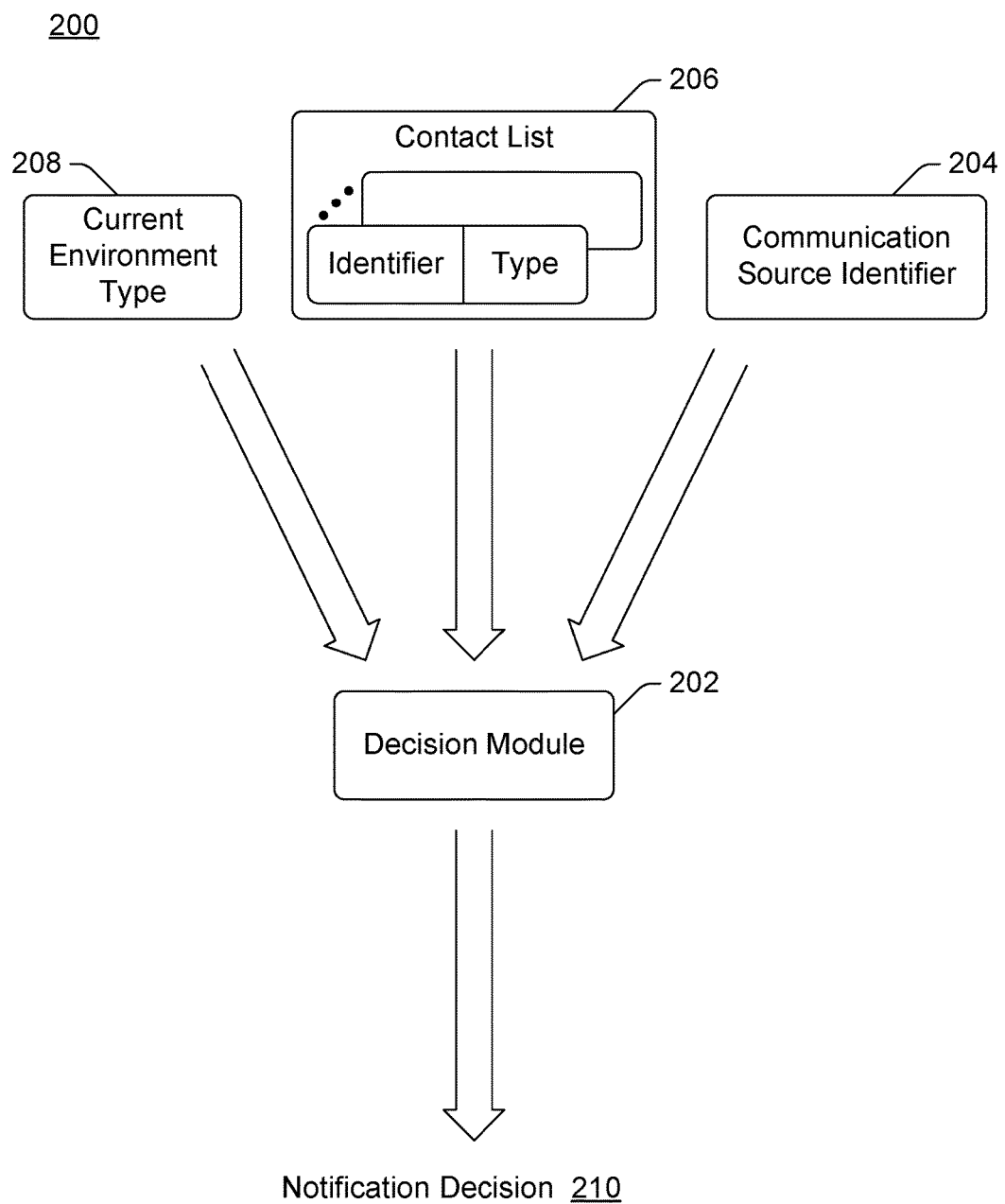
FIG. 2 is a block diagram illustrating an example system generating notification decisions in accordance with one or more embodiments.

FIG. 2 is a block diagram illustrating an example system 200 generating notification decisions in accordance with one or more embodiments. System 200 includes a decision module 202 that determines what notification a mobile communications device is to present for a received communication, analogous to decision module 122 of FIG. 1.

Decision module 202 obtains a communication source identifier 204, which is an identifier of the source of the communication as discussed above. Contact list 206 is analogous to contact list 116 of FIG. 1, and includes multiple contacts each having an identifier and an associated environment type. Given communication source identifier 204, decision module 202 obtains the contact information having that identifier, and obtains the environment type associated with that contact (and thus the communication source from which the communication was received).

Decision module 202 also obtains the current environment type 208 from a current environment indicator (e.g., current environment indicator 124 of FIG. 1). Decision module 202 compares the current environment type to the environment type associated with the communication source from which the communication was received. Decision module 202 outputs a notification decision 210 indicating a type of notification of the communication (if any) that is to be presented by the mobile communications device based on whether the two environment types match. The different types of notification are discussed in more detail below.

The two environment types match if the environment type associated with the communication source is satisfied by the current environment type. For example, if the current environment type is work, then the two environment types match if the environment type associated with the communication source is work or both, but the two environment types do not match if the environment type associated with the communication source is personal. By way of another example, if the current environment type is personal, then the two environment types match if the environment type associated with the communication source is personal or both, but the two environment types do not match if the environment type associated with the communication source is work.

Returning to FIG. 1, notification module 108 may or may not (depending on the notification decision output from decision module 122) notify UI module 112 to present a notification of the received communication. Different types of notifications of a received communication can be presented. In one or more embodiments, these different types include an initial notification and a leave-behind notification. The initial notification, also referred to as a ping, notifies the user of the communication when the communication is received. The leave-behind notification, also referred to as a breadcrumb, notifies the user that the communication was received.

Typically, when a communication is received, an initial notification of the receipt of the communication is presented by device 102 to alert the user to the presence of the communication. This initial notification can include, for example, one or more of playing back an audible notification of the communication (e.g., playing back a ring tone), presenting a haptic notification (e.g., vibrating the mobile communications device), displaying information describing the communication source on screen 114, and so forth. The user can then choose to respond to the communication when it is received (e.g., answer a voice call, send a reply to a text message, etc.). Alternatively, rather than responding to the communication when it is received, the user can input a request to defer or dismiss the initial notification, in which case device 102 ceases presentation of the initial notification (e.g., stops playing back the ring tone). The user may also ignore or miss an initial notification, in which case device 102 ceases presentation of the initial notification after a particular amount of time.

The leave-behind notification is presented by the device 102 to alert the user that a communication was received and was not responded to by the user when the communication was received. This reason for not responding can be that the user deferred or dismissed the initial notification, ignored the initial notification, missed the initial notification, and so forth. This leave-behind notification can take different forms, and oftentimes is a visual notification (e.g., a particular icon or other information that is displayed on screen 114). This leave-behind notification can also identify how many communications were received and not responded to by the user when received (e.g., a number of missed voice calls and/or a number of missed text messages).

If decision module 122 determines that the environment type associated with the communication source is satisfied by the current environment type, then notification module 108 indicates to UI module 112 that an initial notification (and optionally a leave-behind notification) of the communication is to be presented by device 102. The user can then respond to the communication as he or she desires (e.g., answer a voice call, dismiss the initial notification, ignore the initial notification, and so forth). A leave-behind notification is optionally presented by UI module 112 based on whether the user responds to the communication when it is received as discussed above.

However, if decision module 122 determines that the environment type associated with the communication source is not satisfied by the current environment type, then notification module 108 indicates to UI module 112 that UI module 112 is to refrain from presenting an initial notification (so an initial notification of the communication is not presented by device 102). Accordingly, the mobile communications device does not play a ring tone, does not vibrate, and does not display information describing the communication source on screen 114. In one or more embodiments, if decision module 122 determines that the environment type associated with the communication source is not satisfied by the current environment type, then notification module 108 also indicates to UI module 112 that a leave-behind notification of the communication is not to be presented by device 102. In alternate embodiments, notification module 108 indicates to UI module 112 that a leave-behind notification of the communication is to be presented by device 102. Thus, in such alternate embodiments a leave-behind notification of the communication is presented by device 102 even though no initial notification of the communication was presented by device 102, and even though the environment type associated with the communication source is not satisfied by the current environment type.

It should be noted that even though a notification of the communication is not presented by mobile communications device 102, the communication is still received. For example, a text message or IM message can be received and stored by mobile communications device 102, allowing the user to subsequently access the message regardless of whether the environment type associated with the communication source is satisfied by the current environment type at the time of accessing. By way of another example, a voice call can still be answered by a voicemail system (on device 102 or a remote service) and stored as a voicemail message, allowing the user to subsequently retrieve the voicemail message regardless of whether the environment type associated with the communication source is satisfied by the current environment type at the time of retrieval.

Additionally, in one or more embodiments if the notification decision output from decision module 122 indicates that the mobile communications device is to refrain from presenting an initial notification of the communication, notification module 108 provides an indication of the notification decision output to communication module 106. In response to the notification decision, communication module 106 provides a response to the communication source from which the communication was received. This response can be, for example, a text (or other types of content) message indicating that the user of device 102 is currently unavailable, a voicemail message indicating that the user of device 102 is currently unavailable, and so forth. The particular content of such a response can be predetermined by communication module 106, or alternatively can be a response pre-selected (or otherwise previously input) by the user of device 102. Additionally, communication module 106 itself can provide the response, or alternatively can communicate with a remote service (e.g., a voicemail service) to provide the response.

Furthermore, in one or more embodiments UI module 112 is notified (e.g., by notification module 108 or alternatively another module of device 102) each time current environment type indicator 124 is changed. In response to current environment type indicator 124 being changed, UI module 112 can take one or more actions to alter the user interface presented by device 102. These actions can take a variety of different forms including changing information presented by UI module 112 as well as changing the manner in which information is presented by UI module 112.

The information presented by UI module 112 can be changed in a variety of different manners. For example, shortcuts to different applications can be displayed, shortcuts to different RSS (Really Simple Syndication) feeds can be displayed, an image displayed as a background or wallpaper on screen 114 can be changed, views for a calendar (e.g., month view, week view, day view) can be changed, and so forth. Furthermore, different lists of most recently used, commonly used, or favorite items can be maintained for different environment types, and the appropriate list selected and used by UI module 112 (and/or other modules of device 102) based on the current environment type indicator 124. For example which contacts in contact list 116 are displayed at the beginning when list 116 is accessed by a user of device 102 can be changed, which web site links are listed as favorites can be changed, and so forth.

This change in information that is displayed can be implemented in a variety of different manners. In one or more embodiments, mobile communications device 102 maintains an information store (not shown), such as an operating system registration store (e.g., an operating system registry) or other store. An indication of what information is to be displayed for which current environment type indicator is maintained in this information store and is accessed by UI module 112 (and/or other modules of mobile communications device 102) to determine what information is to be displayed for a particular current environment type indicator.

The manner in which information is presented by UI module 112 can also be changed in a variety of different manners. For example, information can be displayed using different colors, different types of borders, different font types, different font sizes, and so forth. By way of another example, the orientation of the display on screen 114 can be changed (e.g., from landscape to portrait or vice versa), information can be changed from being displayed on screen to being played back audibly, and so forth. This change in the manner in which information is presented can be implemented in different manners, such as using an information store (as discussed above) in which an indication of how information is to be displayed for particular current environment type indicators is maintained.

It should also be noted that situations can arise in which a communication is received from a communication source for which no contact is included in contact list 116. Such situations can be handled in different manners. In one or more embodiments, the default associated environment type for communication sources is used as the environment type associated with the communication source. In other embodiments, other environment types can be associated with the communication source (e.g., a default communication type selected by the user of device 102).

It should also be noted that situations can arise where no notification of a communication is presented by device 102 because the environment type associated with the communication source was not satisfied by the current environment type at the time the communication was received. In such situations, notification module 108 (or alternatively another module of device 102) maintains a record of those communications. Subsequently, when the current environment type of device 102 is changed so that the environment type associated with the communication source is now satisfied by the current environment type, notifications of those recorded communications are presented by UI module 112.

For example, assume that two voice calls are received from two different devices 104, each having an associated environment type of work, while the current environment type of device 102 is personal. Initial and leave-behind notifications of these two voice calls are not presented by UI module 112 because the environment type associated with the communication sources is not satisfied by the current environment type. However, when the user subsequently changes the current environment type of device 102 to work, UI module 112 displays (or otherwise presents) leave-behind notifications of these two voice calls because the environment type associated with the communication sources for the recorded communications is now satisfied by the current environment type.

Figure 3:
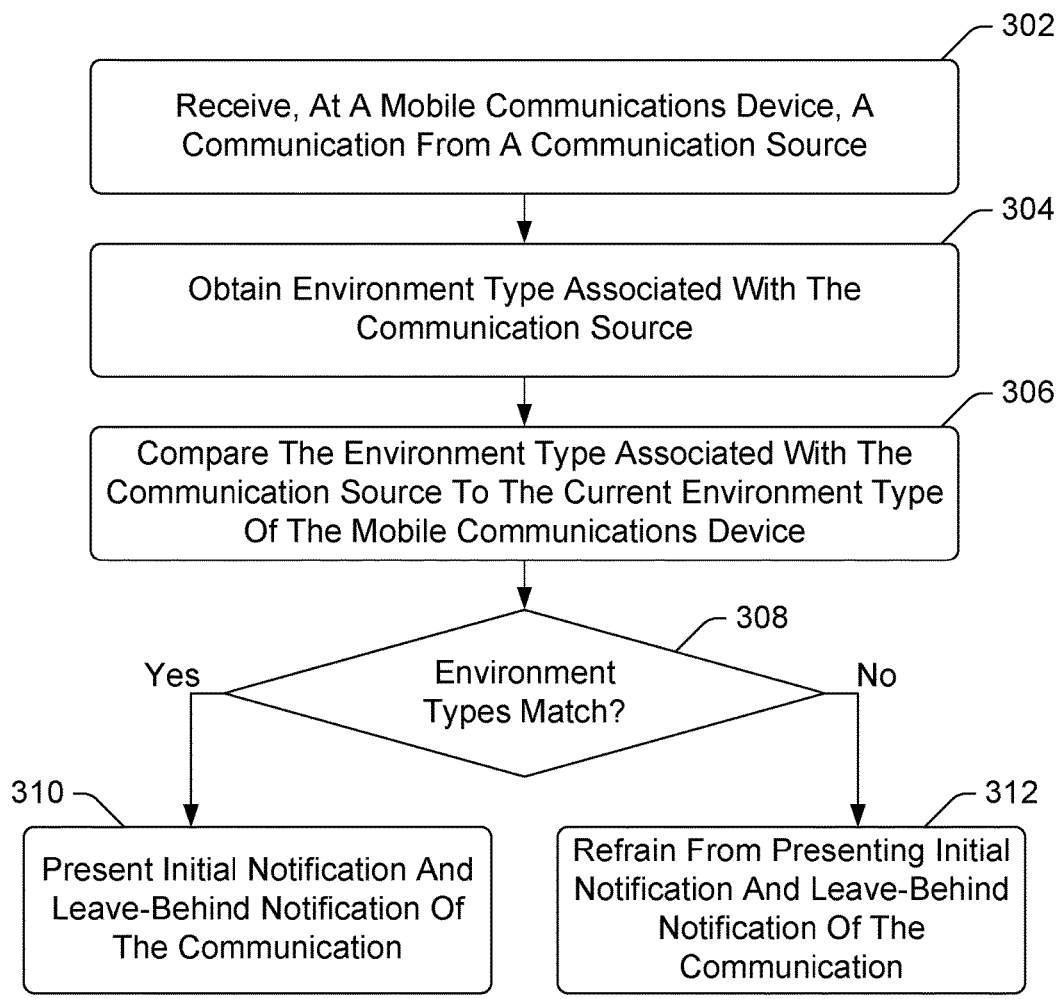
FIG. 3 is a flowchart illustrating an example process for implementing the user-selectable environments for mobile communications devices in accordance with one or more embodiments.

FIG. 3 is a flowchart illustrating an example process 300 for implementing the user-selectable environments for mobile communications devices in accordance with one or more embodiments. Process 300 is carried out by a mobile communications device, such as a device 102 of FIG. 1, and can be implemented in software, firmware, hardware, or combinations thereof. Process 300 is illustrated as a set of acts, although the acts need not be performed in the order illustrated in FIG. 3. Process 300 is an example process for user-selectable environments for mobile communications devices; additional discussions of user-selectable environments for mobile communications devices are included herein with reference to different figures.

In process 300, at a mobile communications device a communication is received from a communication source (act 302). As discussed above, this communication can take a variety of different forms, such as a voice call, a text (or other content type) message, and so forth.

An indication of an environment type associated with the communication source is obtained (act 304). This indication can be obtained, for example, from a local contact list or a remote contact list as discussed above.

The environment type associated with the communication source is compared to the current environment type of the mobile communications device (act 306). Process 300 then proceeds based on whether the two environment types compared in act 306 match (act 308).

If the two environment types compared in act 306 match, then an initial notification and leave-behind notification of the received communication is presented (act 310). For example, a ring tone for the device implementing process 300 is played back, and an indication of a number of missed voice calls is displayed. The particular initial and leave-behind notifications presented can vary (e.g., based on user configuration of the device implementing process 300, based on the type of communication (e.g., different ring tones for text messages and voice calls), and so forth). It is to be appreciated that a leave-behind notification need not be presented if the user responds to the communication (e.g., answers the voice call) as discussed above.

However, if the two environment types compared in act 306 do not match, then the device refrains from presenting an initial notification and leave-behind notification of the communication (act 312). Alternatively, a leave-behind notification of the communication can optionally be presented in act 312 even though an initial notification of the communication is not presented as discussed above.

Figure 4:
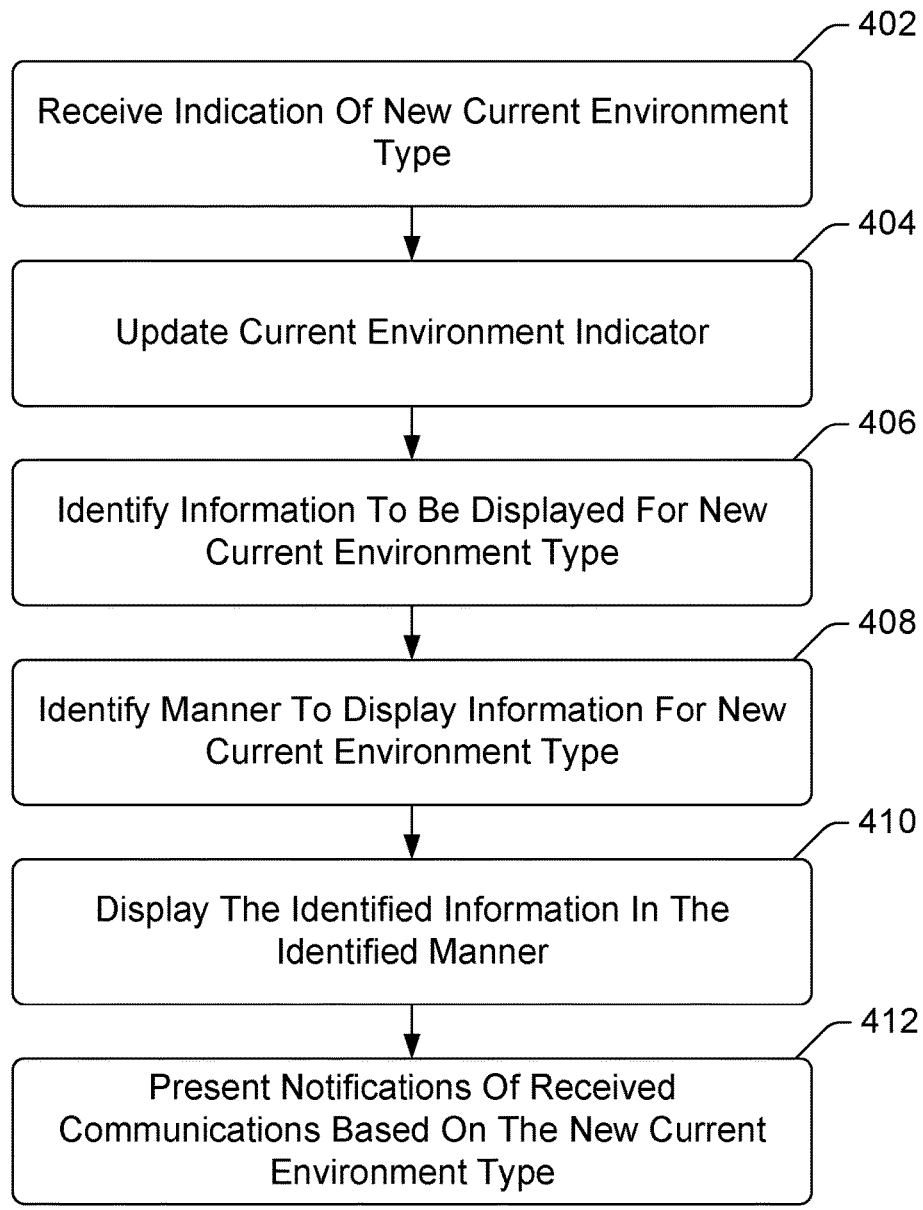
FIG. 4 is a flowchart illustrating an example process for implementing the user-selectable environments for mobile communications devices in accordance with one or more embodiments.

FIG. 4 is a flowchart illustrating an example process 400 for implementing the user-selectable environments for mobile communications devices in accordance with one or more embodiments. Process 400 is carried out by a mobile communications device, such as a device 102 of FIG. 1, and can be implemented in software, firmware, hardware, or combinations thereof. Process 400 is illustrated as a set of acts, although the acts need not be performed in the order illustrated in FIG. 4. Process 400 is an example process for user-selectable environments for mobile communications devices; additional discussions of user-selectable environments for mobile communications devices are included herein with reference to different figures.

In process 400, an indication of a new current environment type is received (act 402). This current environment type can be a variety of different environment types as discussed above. The indication is received in response to a user selection of a current environment type as discussed above (e.g., user selection of a particular button or key, user selection of particular times or locations that correspond to particular environment types, and so forth). Based on the indication, a current environment indicator is updated to reflect the new current environment type (act 404).

Information to be displayed for the new current environment type is identified (act 406). The information to be displayed for a particular environment type can be determined in different manners as discussed above. Additionally, the manner in which to display information for the new current environment type is identified (act 408). The manner in which information is to be displayed for a particular environment type can be determined in different manners as discussed above.

The information identified in act 406 is displayed in the manner identified in act 408 (act 410). Additionally, notifications (initial notifications and/or leave-behind notifications) of received communications are presented based on the new current environment type (act 412). Whether an initial notification and/or leave-behind notification is presented for a particular communication is based on the new current environment type and the environment type associated with the source of the communication as discussed above.

Thus, as can be seen from the discussions herein, various changes can be made to the mobile communications device as a result of a simple selection by the user. For example, the user can quickly and easily activate a switch from a personal environment type to a work environment type, resulting in numerous changes being made to his or her device. These changes include phone calls from work contacts (but not personal contacts) will now ring on his or her device and leave behind missed call indications, text messages from work contacts (but not personal contacts) will now ring on his or her device and leave behind missed message indications, shortcuts to applications that he or she uses for work are now displayed on his or her device, and so forth. The user can then quickly and easily change back to the personal environment type by activating a switch from the work environment type to the personal environment type. After this change back to the personal environment type, phone calls from his or her work contacts no longer ring or leave behind missed call indications on his or her device but phone calls from personal contacts do ring on his or her device and leave behind missed call indications, text messages from work contacts no longer ring and leave behind missed message indications on his or her device but text messages from personal contacts do ring on his or her device and leave behind missed message indications, and so forth.

Figure 5:
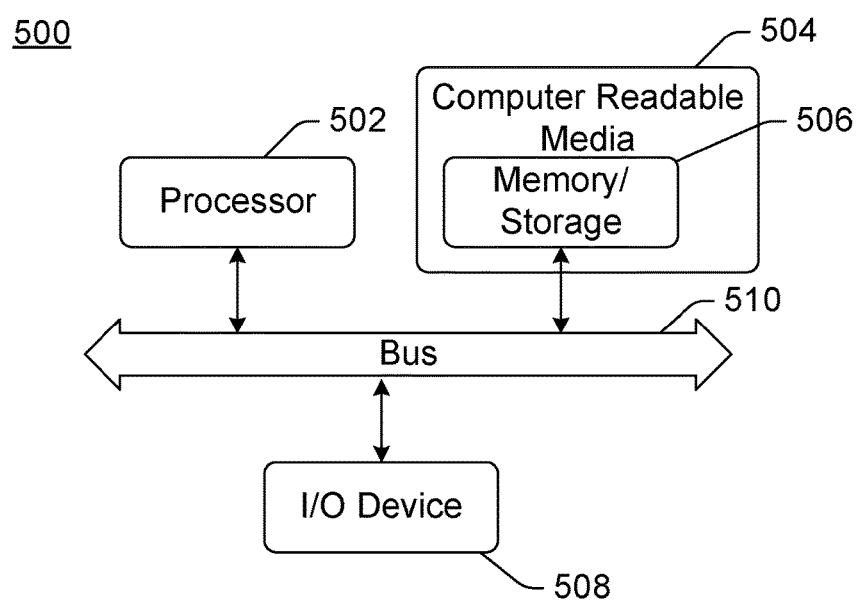
FIG. 5 illustrates an example device that can be configured to implement the user-selectable environments for mobile communications devices in accordance with one or more embodiments.

FIG. 5 illustrates an example device 500 that can be configured to implement the user-selectable environments for mobile communications devices in accordance with one or more embodiments. Device 500 can be, for example, a mobile communications device 102 of FIG. 1.

Device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or nonvolatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of device 500, such as in a processing unit 502, in various cache memories of a processing unit 502, in other cache memories of device 500 (not shown), on other computer readable media, and so forth. Additionally, it is to be appreciated that the location where instructions are stored in device 500 can change over time.

One or more input/output devices 508 allow a user to enter commands and information to device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a device. By way of example, and not limitation, computer readable media may comprise "computer storage media" and "communications media."

"Computer storage media" include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the user-selectable environments for mobile communications devices techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method implemented in a mobile communications device, the method comprising:
    receiving a first setting of the mobile communications device that selects a current environment type of the mobile communications device from two or more different mobile communications device environment types, the first setting comprising an environment type in which interruptions are not permitted;
    receiving a communication from a communication source;
    obtaining an identifier of the communication source;
    comparing the identifier of the communication source to the current environment type of the mobile communications device;
    based on comparing the identifier of the communication source to the current environment type,
        preventing presentation of a notification of the communication,
        maintaining a record of the communication, including the identifier of the communication source, received at the mobile communications device as a missed communication,
    receiving a second setting changing the current environment type of the mobile communications device from the environment type in which interruptions are not permitted to an environment type in which interruptions are permitted, and
    after receiving the second setting that changes the current environment:
        presenting a leave-behind notification for the communication, the leave-behind notification including an indication that the notification of the communication was previously received; and
        changing a manner in which information is presented on the mobile communications device by at least accessing an information store that maintains indications of how the information is to be displayed for each of the two or more different mobile communications environment types.

2. A method as recited in claim 1, wherein the current environment type of the mobile communications device is indicated by user-selection of a switch of the mobile communications device.

3. A method as recited in claim 1, further comprising presenting the leave-behind notification of the communication only if the identifier of the communication source satisfies the current environment type of the mobile communications device.

4. A method as recited in claim 1, wherein the communication comprises a voice call.

5. A method as recited in claim 1, wherein obtaining the identifier of the communication source comprises obtaining the identifier from a remote contact list of a user of the mobile communications device.

6. A method as recited in claim 1, wherein the current environment type of the mobile communications device is determined based on a current time for the mobile communications device.

7. A method as recited in claim 1, wherein the current environment type of the mobile communications device is determined based on a current location of the mobile communications device.

8. A method as recited in claim 1, further comprising:
identifying, based on the current environment type of the mobile communications device, information to be displayed; and
displaying the identified information.

9. A method as recited in claim 1, further comprising:
identifying, based on the current environment type of the mobile communications device, a manner in which information is to be displayed; and
displaying the information in the identified manner.

10. A method as recited in claim 1, wherein the two or more different mobile communications device environment types further comprise a work environment and a personal environment.

11. A method as recited in claim 1, further comprising, when the identifier of the communication source from which a communication is received cannot be obtained, associating a default identifier with the communication source.

12. A method as recited in claim 11, wherein the default identifier is user-selectable.

13. A mobile communications device comprising:
a current environment indicator identifying a current environment type, the current environment type being selectable by user input from two or more different environment types including an environment type in which interruptions are not permitted and an environment type in which interruptions are permitted;
a contact list identifying multiple communication sources from which communications can be received, and for each communication source identifying an environment type associated with the communication source;
a decision module operable to obtain the current environment type of the mobile communications device and an identifier of a communication source from which a communication is received, compare the identifier of the communication source from which the communication is received to the current environment type in which the mobile communications device is being used, and based on comparing, output a notification decision; and
a notification module operable to receive the notification decision, and based on the notification decision, when the notification decision indicates that the current environment type of the mobile communications device is not satisfied by the identifier of the communication source from which the communication is received, prevent presentation of a notification of the communication via a user interface module, and maintain a record of the communication, including the identifier of the communication source from which the communication is received, as a missed communication, and
when the current environment type of the mobile communications device is changed from the environment type in which interruptions are not permitted to an environment type in which interruptions are permitted, notify the user interface module to present a leave-behind notification for the communication, the leave-behind notification including an indication that the communication was previously received, and
change a manner in which information is presented on the mobile communications device by at least accessing an information store that maintains indications of how the information is to be displayed for each of the two or more different mobile communications environment types.

14. A mobile communications device as recited in claim 13, wherein the mobile communications device further comprises a switch, and wherein the current environment type in which the mobile communications device is being used is indicated by user-selection of the switch.

15. A mobile communications device as recited in claim 13, wherein the user interface module is further operable to:
identify, based on the current environment type in which the mobile communications device is being used, information to be displayed; and
display the identified information.

16. A mobile communications device as recited in claim 15, wherein the user interface module is further operable to:
identify, based on the current environment type in which the mobile communications device is being used, a manner in which the identified information is to be displayed; and
display the identified information in the identified manner.

17. A mobile communications device as recited in claim 13, wherein the two or more different environment types further comprise a work environment and a personal environment.

18. A mobile communications device as recited in claim 13, wherein the decision module is further operable to obtain a default identifier for the communication when the identifier of the communication source cannot be obtained.

19. A mobile communications device as recited in claim 18, wherein the default identifier is selectable by user input.

20. One or more computer readable storage media not consisting of transitory signals and having stored thereon multiple instructions that, when executed by one or more processors of a mobile communications device, cause the one or more processors to:
receive a first setting of the mobile communications device that selects a current environment type of the mobile communications device from two or more different mobile communications device environment types, the first setting comprising an environment type in which interruptions are not permitted;
receive a communication from a communication source;
obtain an identifier of the communication source;
compare the identifier of the communication source to the current environment type of the mobile communications device;
based on comparing the identifier of the communication source to the current environment type, prevent presentation of a notification of the communication, maintain a record of the communication, including the identifier of the communication source, received at the mobile communications device as a missed communication, receive a second setting changing the current environment type of the mobile communications device from the environment type in which interruptions are not permitted to an environment type in which interruptions are permitted, and after receiving the second setting that changes the current environment:

present a leave-behind notification for the communication, the leave-behind notification including an indication that the notification of the communication was previously received; and change a manner in which information is presented on the mobile communications device by at least accessing an information store that maintains indications of how the information is to be displayed for each of the two or more different mobile communications environment types.

\* \* \* \* \*